(12) United States Patent
Yamazaki et al.

(10) Patent No.: US 6,565,497 B1
(45) Date of Patent: May 20, 2003

(54) COMPLEX MACHINING MACHINE TOOL

(75) Inventors: Tsunehiko Yamazaki; Naoe Fukumura, both of Nagoya; Masayoshi Mizukado, Kani; Kazuhiro Kikata, Gifu; Sadami Miyazaki, Konan; Koichi Maki, Nagoya, all of (JP)

(73) Assignee: Yamazaki Mazak Kabushiki Kaisha (JP)

( * ) Notice: Subject to any disclaimer, the term of this patent is extended or adjusted under 35 U.S.C. 154(b) by 8 days.

(21) Appl. No.: 09/651,957

(22) Filed: Aug. 31, 2000

(30) Foreign Application Priority Data

Jun. 23, 2000 (JP) .................................... 2000-189289
Jun. 23, 2000 (JP) .................................... 2000-189407

(51) Int. Cl.⁷ ..................... B23Q 3/155; G06F 15/00; B23B 1/00
(52) U.S. Cl. .............. 483/11; 29/27 R; 29/27 C; 82/1.11; 409/80; 483/1; 700/160; 700/179
(58) Field of Search ................... 29/27 C, 27 R, 29/39, 41, 40; 82/1.11, 158; 300/565; 700/196, 182, 161, 179, 159, 160, 169, 175; 483/1, 6, 10, 11, 12, 14; 409/80, 79; 400/35

(56) References Cited

U.S. PATENT DOCUMENTS

| 4,472,782 A | * | 9/1984 | Suzuki | 700/161 |
| 4,945,488 A | * | 7/1990 | Carver et al. | 700/182 |
| 5,724,264 A | * | 3/1998 | Rosenberg et al. | 700/161 X |
| 6,098,258 A | * | 8/2000 | Shimomura | 29/27 C |

FOREIGN PATENT DOCUMENTS

| JP | 402308309 A | * | 12/1990 | 483/11 |
| JP | 404087759 A | * | 3/1992 | 483/1 |
| JP | 406348329 A | * | 12/1994 | 409/80 |
| JP | 2000-126901 | | 5/2000 | |
| JP | 2000-126909 | | 5/2000 | |
| JP | 2000-126953 | | 5/2000 | |

* cited by examiner

Primary Examiner—William Briggs
(74) Attorney, Agent, or Firm—Richard P. Gilly

(57) ABSTRACT

In a complex machining machine tool, a tool rest capable of attachably and detachably installing tool installing inserts thereon is provided, a plural number of virtual tools is set and registered concerning a predetermined at least one tool together with its indexing positional data in tool file, the tool data of the corresponding virtual tool is read out from the tool file on the basis of the machining instruction by the virtual tool stored in machining program, and the corresponding virtual tool is indexed on the tool rest on the basis of the indexing positional data, and then machining with the virtual tool is executed. At the time of machining, it is possible to continue machining with the same tool by only positional indexing without changing the tool. The work for changing tools can be extremely decreased even if machining contents are changed or it is necessary to change tools by tool exhaustion.

10 Claims, 13 Drawing Sheets

(a)

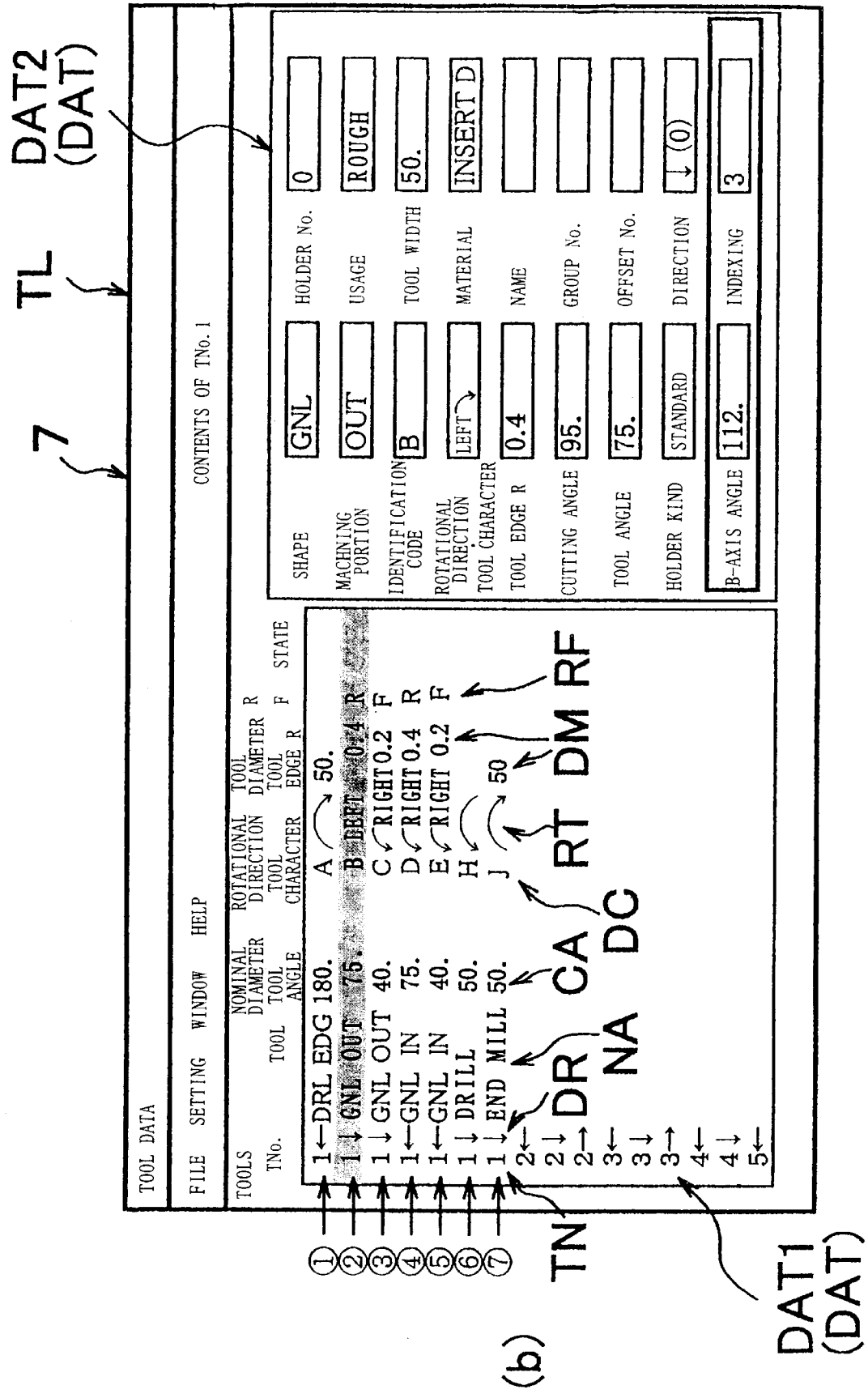

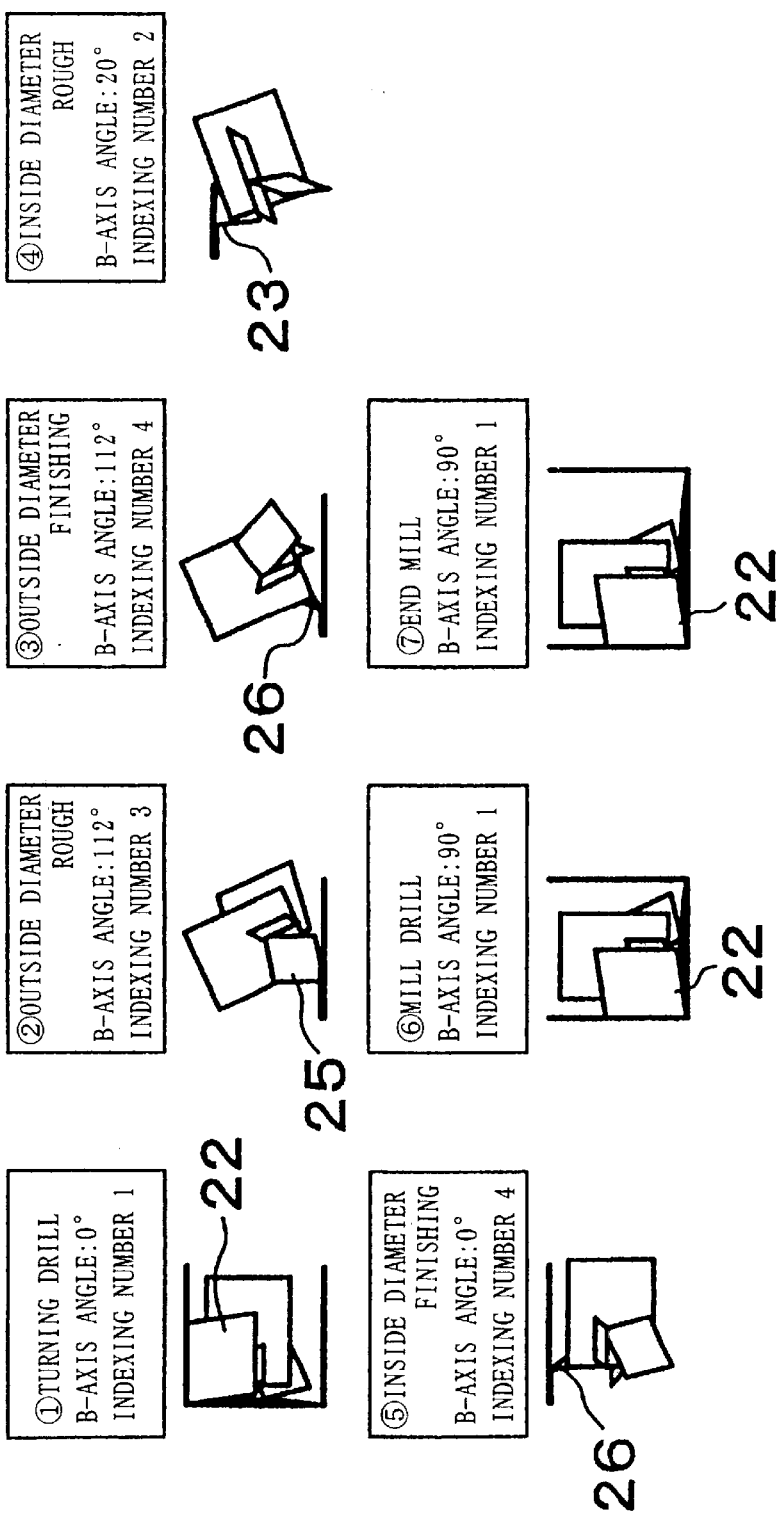

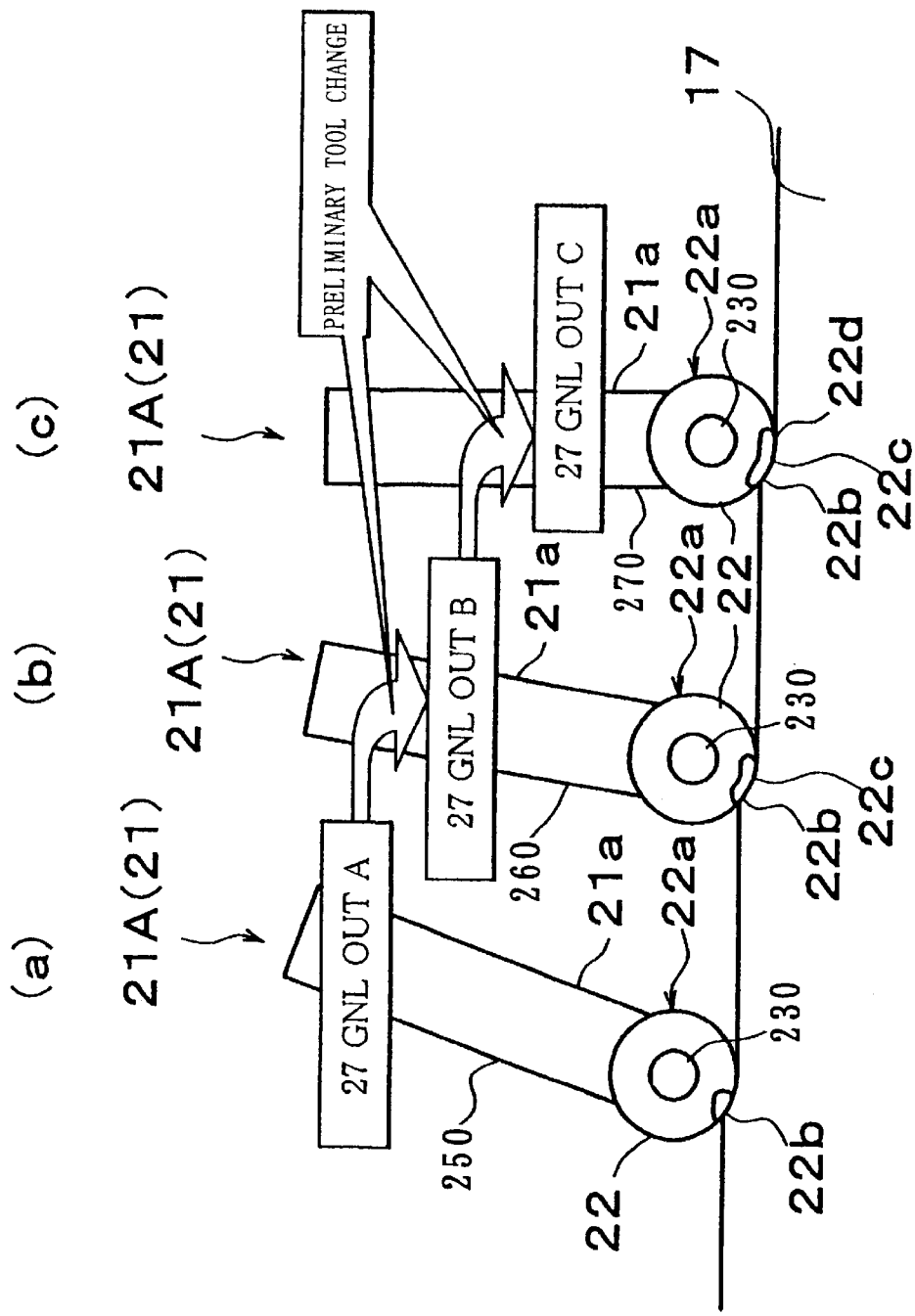

COMPLEX MACHINING MACHINE TOOL

BACKGROUND OF THE INVENTION

This invention relates to a complex machining machine tool capable of extremely decreasing work for changing tool even if there is a need of changing tool because of change of machining contents or tool exhaustion.

Especially, the present invention relates to a complex machining machine tool, wherein a plurality of inserts is installed on a single holder portion, and a complex tool, capable of performing rotating tool machining, such as turning machining and drilling/milling machining with one tool is used.

Besides, the present invention relates to a complex machining machine tool capable of using single tool as long as possible by doing so as before-mentioned.

In this kind of a conventional machine tool, tools are divided into the tools for turning machining and the tools for drilling/milling machining, machining is performed by changing with attachment and detachment of a tool installed on the tool rest, fitting to the machining to be performed from now on every change of machining contents.

In such a machine tool, it is necessary to change tools every change of machining contents. Then, it takes longer time to change tools, and for this reason, the machining efficiency is decreased. Then, such a proposal that work for change tool is avoided by using a complex tool wherein a plurality of inserts is installed on a single tool so as to increase machining efficiency has been made.

But, it is absolutely impossible to well know the machining contents of such a complex tool in advance by an operator at the time of composing machining program. Then, the development of the machine tool capable of machining with the complex tool without being conscious about the complex tool by an operator is desired.

Besides, the occurrence of work for tool change is not always the time of change of machining contents. When the tool is exhausted even if the same tool is used, it is necessary to change tool. To extremely shorten the tool change operation by such tool exhaustion is important on increasing machining efficiency.

Especially, for such purposes, the tool installing a button insert formed in a disc shape as a whole is used. In such a case, an operator loosens the clamp of the insert, and slightly rotates the insert so as to fix again, and uses another pre-exhausted part of the insert for machining in order to save the work for tool change when the part of the insert to be used for machining is exhausted.

But, in such a method, it is necessary to stop driving of a machine, to loosen the clamp of the insert by an operator and to slightly rotate the insert every time the insert exhausts although the work for tool change is avoided. Then, it takes longer time for this operation and it is not efficient.

The first object of the present invention is to provide a complex machining machine tool capable of extremely decreasing work for changing tools when the necessity of changing tool occurs owing to change of machining contents or tool exhaustion, taking the above-mentioned circumstances into consideration.

The second object of the present invention is to provide a complex machining machine tool capable of easily using a complex tool without knowledge concerning the complex tool when the complex tool is used in order to decrease the work for tool change.

Furthermore, the third object of the present invention is to provide a complex machining machine tool capable of exercising similar effects without rotating insert by an operator in order to decrease work for tool change.

SUMMARY OF THE INVENTION

The invention of claim 1 is complex machining machine tool having a tool rest capable of attachably and detachably installing a tool having inserts, said complex machining machine tool comprising:

tool file for storing tool data concerning a tool to be used in machining program;

a plurality of virtual tools set and registered concerning predetermined at least one tool in said tool file;

said tool data concerning said predetermined at least one tool stored every said virtual tool, including its indexing positional data;

virtual tool indexing means for reading out tool data of corresponding virtual tool from said tool file on the basis of machining instruction by the virtual tool stored in said machining program and indexing the virtual tool corresponding to said predetermined at least one tool on said tool rest on the basis of said indexing positional data of said tool data; and machining execution portion for executing machining with the indexed virtual tool.

According to the invention of claim 1, a plurality of virtual tools is set concerning a single tool, indexing positional data is stored every each virtual tool in the tool data, and the virtual tools are selectively indexed so as to use on the basis of the indexing positional data. By doing so, it is possible to continue machining with the same tool without changing tools by only positional indexing at the time of machining. The work for tool change can be extremely decreased even if the necessity of changing tool occurs owing to change of machining contents or tool exhaustion.

The invention of claim 2 is the complex machining machine tool, having a plurality of inserts on said predetermined at least one tool, capable of performing turning machining and milling machining on a workpiece by the tool by selectively indexing and using said insert installed on the tool, wherein a plurality of said predetermined at least one tool is set and registered as the virtual tool for executing the machining concerning a plurality of machining capable of performing with this tool in said tool file.

According to the invention of claim 2, since a plurality of virtual tools are set concerning the tool installing a plurality of inserts according to the machining contents in the tool file, the selection of the tool finishes only by designating the virtual tool to be used in the machining program. Then, the tool installing a plurality of inserts thereon can be used with a similar sense as a normal tool without being conscious about the tool by an operator.

The invention of claim 3 is the complex machining machine tool, wherein a plurality of virtual tools is set concerning one insert in said tool file.

According to the invention of claim 3, since a plurality of virtual tools are set on a single insert, various kinds of machining is possible with one tool, then, the tool exchanging time can be shortened so as to perform efficient machining.

The invention of claim 4 is the complex machining machine tool, wherein two kinds of tools, a turning tool and a milling tool are set concerning one insert in said tool file.

In the invention of claim 4, since a turning tool and a milling tool are set on a single insert, various kinds of machining is possible with the complex tool, then, the tool exchanging time can be shortened so as to perform efficient machining.

The invention of claim 5 is the complex machining machine tool, wherein said tool is a turning tool, said tool rest is movably and drivably provided in a first axial direction and a second axial direction orthogonal to each other, and the tool rest is provided being free to position its rotational angle with a third axis orthogonal to the first axial direction and the second axial direction as its center, capable of performing turning machining on a rotating workpiece by said turning tool, wherein a plurality of virtual tools of the same kind which indexing angular position with the third axis as its center is different from another is set and registered concerning at lease one turning tool of said turning tools in said tool file.

In the invention of claim 5, machining is performed by selectively using the virtual tools of the same kind (for instance, in FIG. 10 "GNL OUT" as a tool for outside diameter machining), wherein indexing angular position with the third axis as its center (for instance, the B-axis angles 70°, 80° and 90°) is different, stored in the tool file. By doing so, the rotating operation of the insert for omitting tool change owing to tool exhaustion can be executed on a machine side by the selection of the virtual tools wherein indexing angular position is different with the third axis as its center, and the machining can be continued, easily extending tool life without specially stopping a machine for rotating the insert by an operator.

The invention of claim 6 is the complex machining machine tool, wherein said turning tool is a button cutting tool installing a button insert at its top.

In the invention of claim 6, the button insert is roundly formed in its cutting part face. Then, the setting of a plurality of the virtual tools of the same kind (for instance, in FIG. 10 "GNL OUT" as a tool for outside diameter machining), wherein angular position with the third axis as its center (for instance, the B-axis angles 70°, 80° and 90°) is different, can be easily performed, and it contributes to the machining efficiency.

The invention of claim 7 is the complex machining machine tool, wherein a plurality of virtual tools of the same kind belonging to said one turning tool is differentiated from another in said tool file by affixing the same group mark.

In the invention of claim 7, a plurality of the virtual tools set on the same turning tool by the group mark can be easily differentiated every its kind, it is effective when many virtual tools are set on one cutting tool.

The invention of claim 8 is the complex machining machine tool, wherein said each virtual tool stores information showing tool edge position as tool data in said tool file.

In the invention of claim 8, the information showing tool edge position every each virtual tool (for instance, the tool set information TF of FIG. 10) is stored. Then, even if during machining the virtual tool is changed so as to use , correct tool edge amendment value can be obtained, and highly accurate machining is possible without the operation of re-measurement of the tool edge position.

The invention of claim 9 is the complex machining machine tool, wherein said machining execution portion has tool exhaustion judging means for judging tool exhaustion concerning said virtual tool, substituting tool judging means for adopting another virtual tool of the same kind set on the turning tool on which the virtual tools are set as a substituting tool when the judgement that said virtual tool reaches exhaustion is given by said tool exhaustion judging means, and machining execution means for executing machining by using the virtual tool judged as the substituting tool by said substituting tool judging means.

In the invention of claim 9, as the substituting tool of the virtual tool judged to be exhausted by the tool exhaustion judging means, another virtual tool of the same kind set on the turning tool, on which the virtual tool is set, is adopted. Then, the change of the exhausted tool finishes only by slightly rotating the turning tool with the third axis as its center, and the tool change and the machining operation can be effectively executed.

BRIEF DESCRIPTION OF THE DRAWINGS

FIG. 11 is a view showing an example of use forms of a tool.

DESCRIPTION OF THE PREFERRED EMBODIMENT

Figure 1:
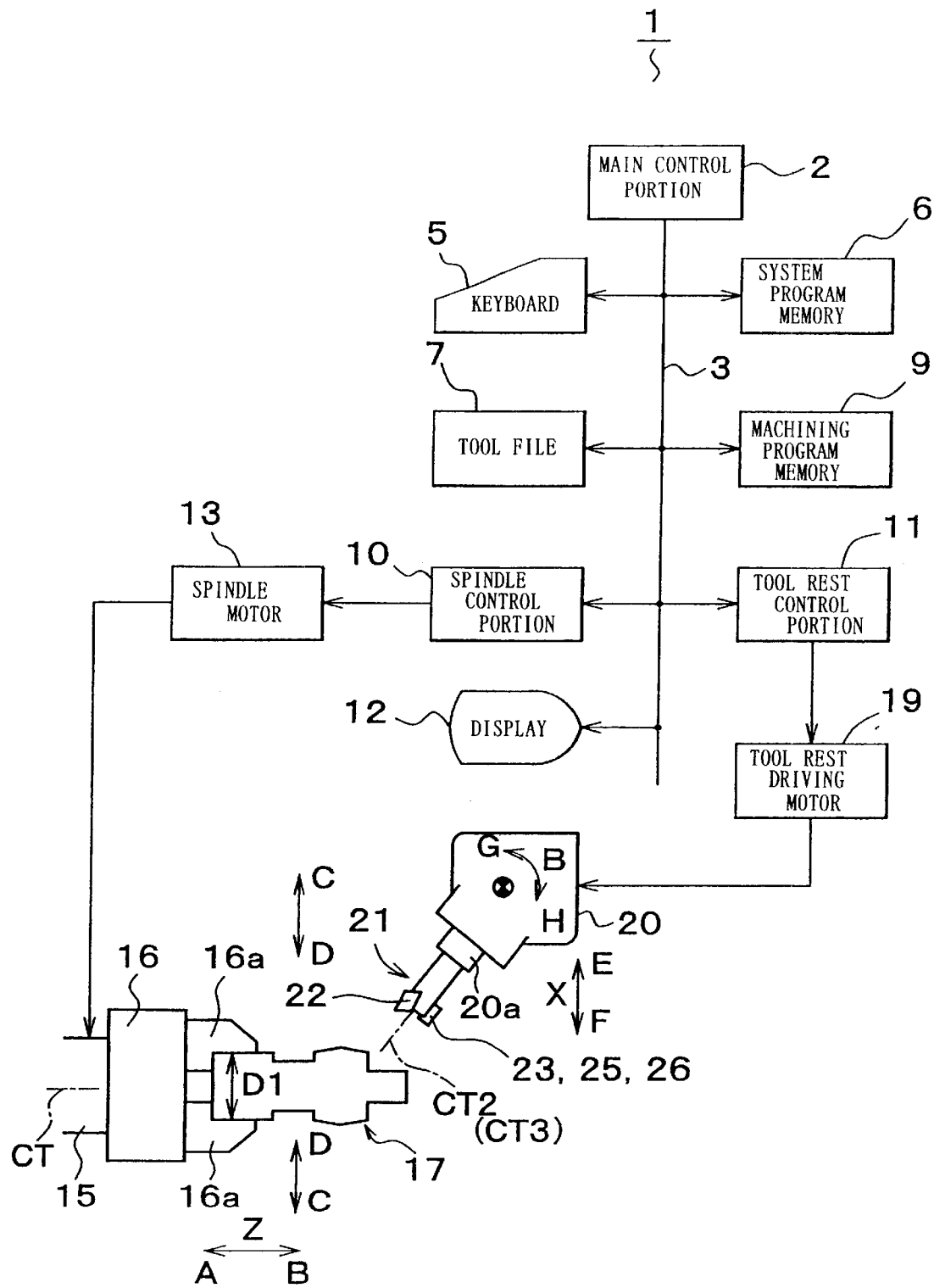
FIG. 1 is a control block diagram showing an example of a complex machining machine tool to which the present invention is applied.

A complex machining machine tool 1 has a main control portion 2, as shown in FIG. 1. With the main control portion 2, an input portion, such as a keyboard 5, a system program memory 6, a tool file 7, a machining program memory 9, a spindle control portion 10, a tool rest control portion 11 and a display 12 are connected through a bus line 3. A spindle motor 13 is connected with the spindle control portion 10. With the spindle motor 13, a spindle 15, being free to rotate, drive and position with axial center CT provided parallel to Z-axis as its center is connected. With the spindle 15, a chuck 16 is provided. Claws 16*a* are provided with the chuck 16, being free to hold and release a workpiece 17 to be machined, being free to move and drive in the directions as shown by arrows C and D.

Tool rest driving motors 19 (the plural number) are connected with the tool rest control portion 11. A tool rest 20 is connected with the tool rest driving motor 19, being free to move and drive in the Z-axis direction and in the direction as shown by arrows E and F rectangular to the Z-axis, that is, in the X-axis direction by the tool rest driving motor 19. Furthermore, the tool rest 20 is provided, being free to move and drive in Y-axis direction rectangular to the X-axis and Z-axis, and rectangular to the paper, and in the direction as shown by arrows G and H which is B-axis direction with the Y-axis as its center by the tool rest driving motor 19.

A tool holding portion 20*a* is formed on the tool rest 20. A turning tool, a milling/drilling tool, and a complex tool 21 capable of turning and milling/drilling machining are provided with the tool holding portion 20*a*, being free to attach, detach and exchange. The tool holding portion 20*a* is provided, being free to fix and hold the complex tool and other tools in a predetermined holding state, and being free to rotate, drive and position around axial center CT2.

Figure 3:
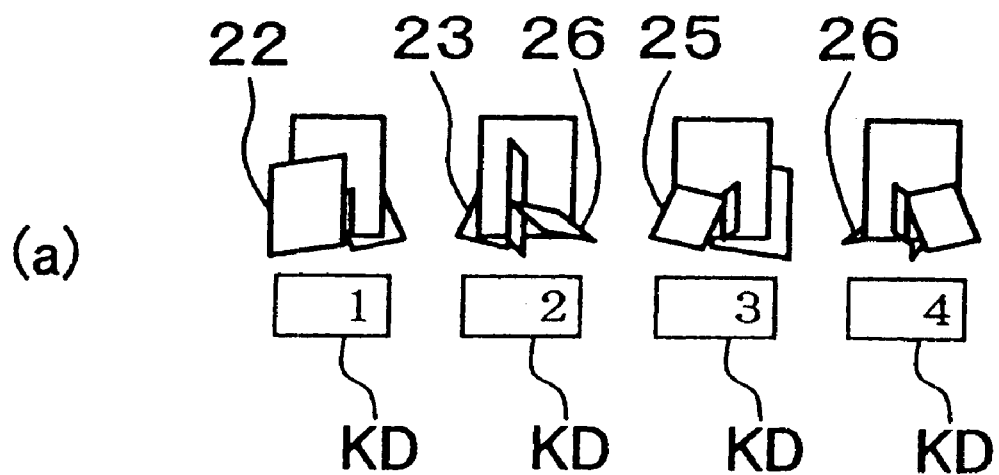
FIGS. 3(*a*)–(*c*) typical views for explaining an example of tool data stored in tool file and its contents.
Figure 4:
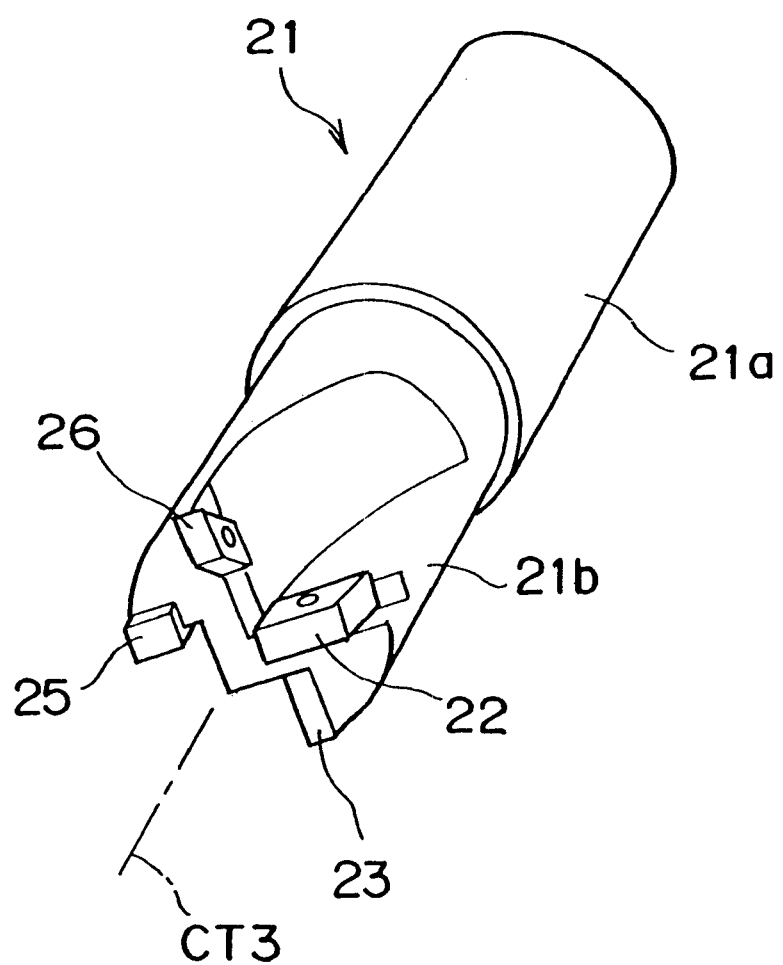
FIG. 4 is a view obliquely showing an example of a complex tool.

The complex tool 21 has a main body 21*a* formed in round bar shape, as shown in FIG. 4. On the top of the main body 21a, an insert installation portion 21b is formed. Four inserts 22, 23, 25 and 26 are respectively installed on the insert installation portion 21b at the pitch of 90° with axial center CT3 of the main body 21a as its center so as to attach and detach. As shown in FIG. 3(a), indexing number KD is set for each insert. The indexing number KD is set as 1 for the insert 22, and clockwise, the indexing number KD is 2 for the insert 23, the indexing number KD is 3 for the insert 25 and the indexing number KD is 4 for the insert 26.

Tool name is allotted to the respective inserts 22, 23, 25 and 26 as a virtual tool according to the machining contents to be performed with the complex tool 21. For the insert 22 which indexing number KD is 1, three kinds of tool name, ① turning drill for performing drilling machining wherein tool itself does not rotate, ⑥ milling drill for performing drilling machining wherein tool itself rotates and ⑦ end mill for performing milling machining is allotted as a virtual tool, as shown in FIG. 3(c). For the insert 23 which indexing number KD is 2, tool name NA, ④ inside diameter rough machining for performing turning rough machining on inside diameter is allotted, for the insert 25 which indexing number KD is 3, tool name NA, ② outside diameter rough machining for performing turning rough machining on outside diameter is allotted, and for the insert 26 which indexing number KD is 4, tool name NA, ③ outside diameter finishing for performing turning finishing machining on outside diameter and ⑤ inside diameter finishing for performing turning finishing machining on inside diameter is allotted as a virtual tool.

Figure 2:
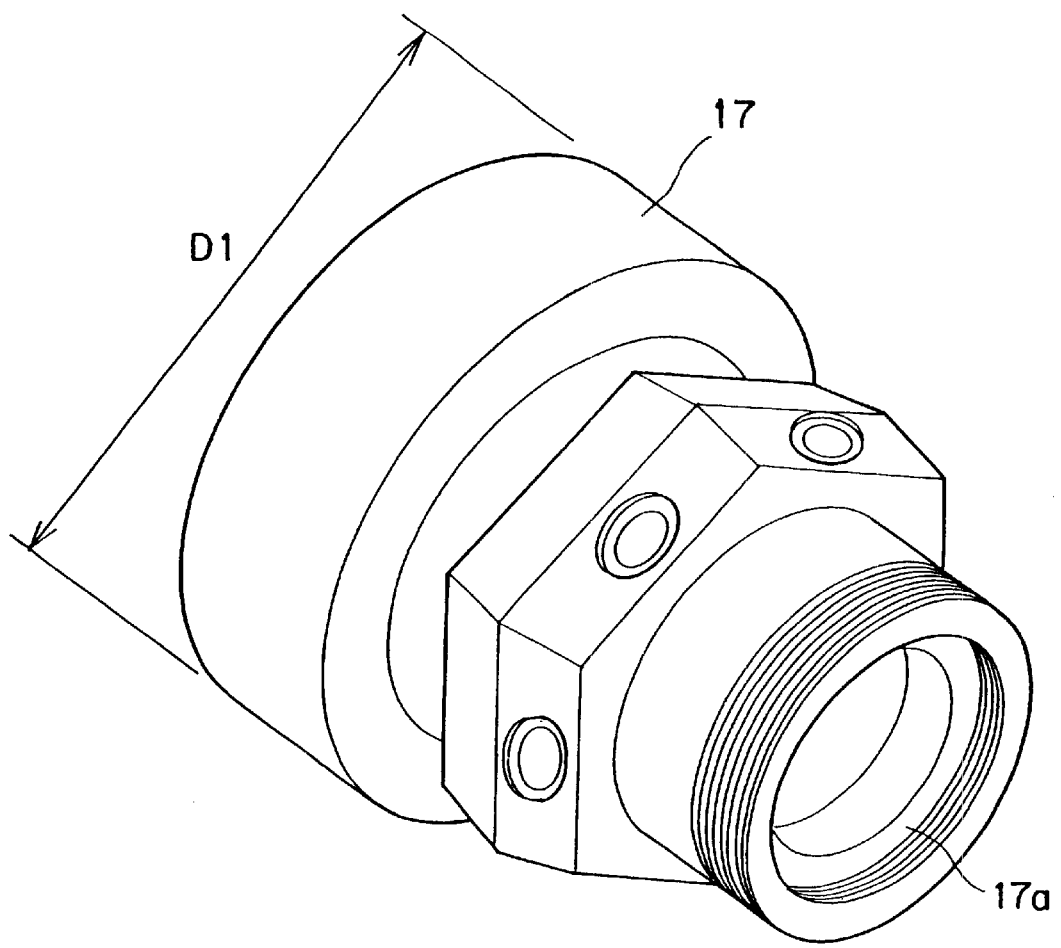
FIG. 2 is a view obliquely showing an example of a workpiece to be machined.

The complex machining machine tool 1 has the before-mentioned structure. Then, in order to machine the cylindrical workpiece 17 which diameter is D1, for instance, as shown in FIG. 2, an operator inputs various kinds of machining data by a known automatic programming method, operating the keyboard 5 so as to compose machining program. On this occasion, the main control portion 2 composes the machining program PRO on the basis of the various kinds of data input by an operator according to a known automatic program composing program stored in the system program memory 6, then the composed machining program PRO is stored in the machining program memory 9.

After the machining program PRO concerning the workpiece 17 is composed, an operator instructs the main control portion 2 to machine the workpiece 17 through the keyboard 5. Receiving this instruction, the main control portion 2 reads out the machining program PRO concerning the workpiece 17 from the machining program memory 9 so as to execute machining, appropriately driving the spindle control portion 10 and the tool rest control portion 11.

Figure 5:
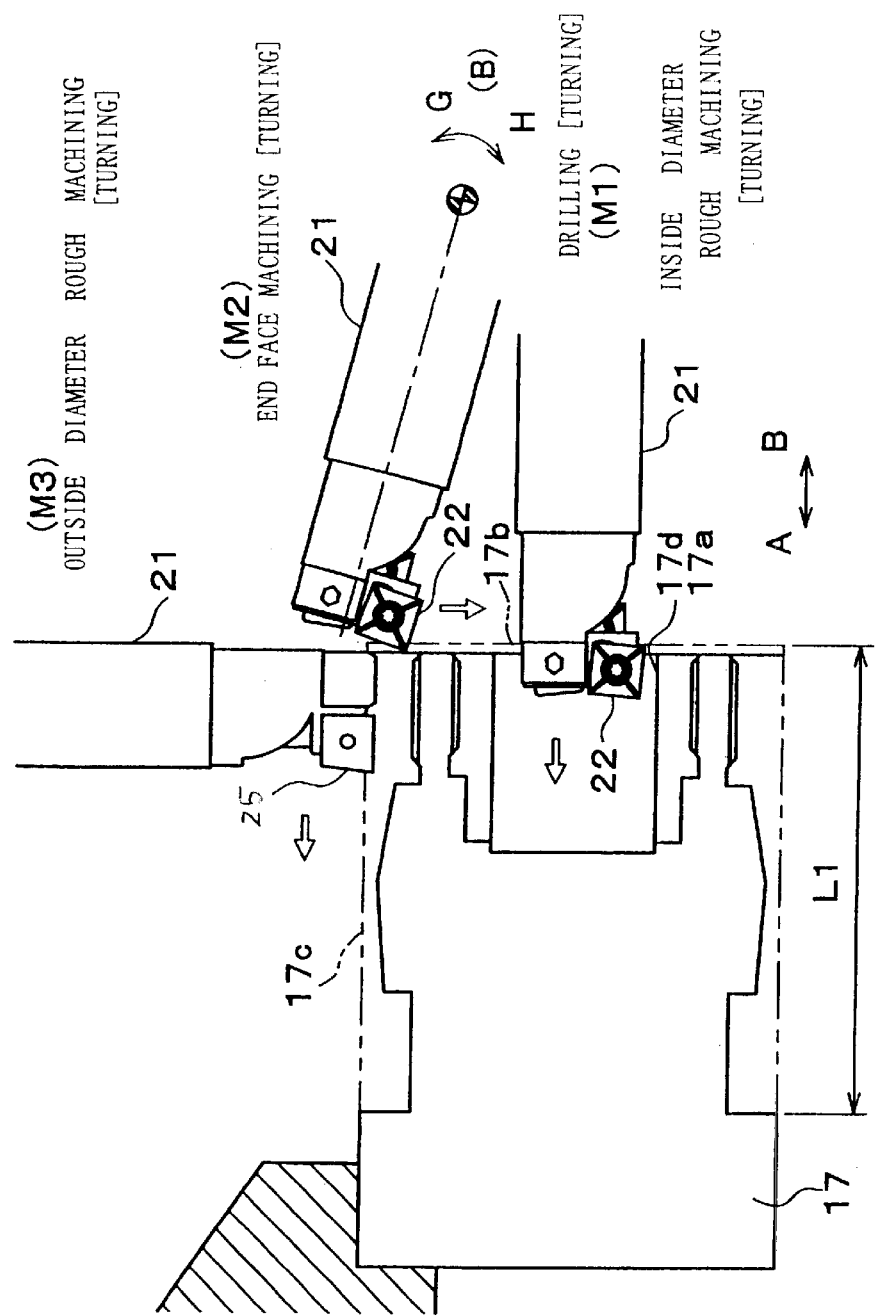
FIGS. 5, 6, 7, and 8 are views showing details when the workpiece as shown in FIG. 2 is machined with the complex tool.

As shown in (M1) of FIG. 5, at the machining on the workpiece 17, the machining for forming a hole 17a on the central portion of the workpiece 17 is firstly performed. The tool to be used at this time is designated by the machining program PRO. The main control portion 2 refers to the tool file 7 when the tool to be used is designated by the machining program PRO, and reads out tool data TL of the corresponding tool.

In the tool file 7, tool number TN, tool setting direction DR, tool name NA, nominal diameter/tool angle CA, suffix DC, rotational direction/tool character RT, tool diameter/tool edge R DM, finishing machining/rough machining division RF of the tool data DAT is set for each tool as chart data DAT1, as shown in FIG. 3(b). Furthermore, detailed data concerning each tool is stored as detailed data DAT2.

The complex tool 21 is set as an independent tool in this tool file 7, dividing into a plurality of virtual tools according to the machining contents capable of machining with the complex tool 21. For instance, seven virtual tools, on which the tool name NA and the suffix DC from ① to ⑦ mentioned before are affixed, are stored as the tool number TN 1 (the example of FIG. 3(b) is one example, and if the machining form with the complex tool 21 extends over many kinds, the virtual tools having many of tool name NA and suffix DC according to the machining kind are registered). That is, every machining contents allotted to the respective inserts 22, 23, 25, 26 of the complex tool 21, the tool data of the inserts 22, 23, 25, 26 for performing the machining contents is stored in the tool file 7, regarding the respective inserts as an independent tool. For instance, the virtual tools ① through ⑦ corresponding to each virtual tool name NA as shown in FIG. 3(c) are stored, corresponding to ① through ⑦ in FIG. 3(b).

That is, the virtual tool of ① turning drill of FIG. 3(c) is registered in such a manner that tool number Tno is 1, tool setting direction is ←, tool name NA is DRL EDG, nominal diameter/tool angle CA is 180, suffix DC is A, rotational direction/tool character RT is right rotation, and tool diameter/tool edge R DM is 50, as shown in ① of FIG. 3(b). On this occasion, tool setting direction DR shows the tool direction as default value by the direction of an arrow, "←" shows the direction wherein the direction of the tool is parallel to the Z-axis, that is, the B-axis angle is 0° and "↓" shows the direction wherein the direction of the tool is parallel to the X-axis, that is, the B-axis angle is 90°.

The virtual tool of ② outside diameter rough machining of FIG. 3(c) is registered in such a manner that tool number TNo is 1, tool setting direction DR is ↓, tool name NA is GNL OUT, nominal diameter/tool angle CA is 75, suffix DC is B, rotational direction/tool character RT is left hand/right rotation, tool diameter/tool edge R DM is 0.4, finishing machining/rough machining division RF is R (rough machining), as shown in ② of FIG. 3(b). The virtual tool of ③ outside diameter finishing machining of FIG. 3(c) is registered in such a manner that tool number TNo is 1, tool setting direction DR is ↓, tool name NA is GNL OUT, nominal diameter/tool angle CA is 40, suffix DC is C, rotational direction/tool character RT is right hand/left rotation, tool diameter/tool edge R DM is 0.2, finishing machining/rough machining division RF is F (finishing machining), as shown in ③ of FIG. 3(b).

Furthermore, the virtual tool of ④ inside diameter rough machining of FIG. 3(c) is registered in such a manner that tool number TNo is 1, tool setting direction DR is ←, tool name NA is GNL IN, nominal diameter/tool angle CA is 75, suffix DC is D, rotational direction/tool character RT is right hand/left rotation, tool diameter/tool edge R DM is 0.4, finishing machining/rough machining division RF is R (rough machining), as shown in ④ of FIG. 3(b). The virtual tool of ⑤ inside diameter finishing machining of FIG. 3(c) is registered in such a manner that tool number TNo is 1, tool setting direction DR is ←, tool name NA is GNL IN, nominal diameter/tool angle CA is 40, suffix DC is E, rotational direction/tool character RT is right hand/left rotation, tool diameter/tool edge R DM is 0.2, finishing machining/rough machining division RF is F (rough machining), as shown in ⑤ of FIG. 3(b).

The virtual tool of ⑥ mill drill of FIG. 3(c) is registered in such a manner that tool number TNo is 1, tool setting direction DR is ↓, tool name NA is drill, nominal diameter/tool angle CA is 50, suffix DC is H, rotational direction/tool character RT is left direction, as shown in ⑥ of FIG. 3(b). The virtual tool of ⑦ end mill of FIG. 3(c) is registered in such a manner that tool number TNo is 1, tool setting direction DR is ↓, tool name NA is end mill, nominal diameter/tool angle CA is 50, suffix DC is J, rotational direction/tool character RT is right direction and tool diameter/tool edge R DM is 50, as shown in ⑦ of FIG. 3(b).

Then, in the machining program PRO, as the tool to be used in the machining program PRO, the tool name NA and the suffix DC of the corresponding virtual tool are designated, regardless of use of the complex tool 21 in the machining, similar to the case of designating a normal tool even if the complex 21 is used. In case of the machining (M1) for forming the hole 17a on the central portion of the workpiece 17 as shown in FIG. 5 as mentioned before, the virtual tool of ① turning drill of the complex tool 21 is used as a tool. So, in this designation, the tool name NA "DRL EDG" and the suffix DC "A" are input in the machining program PRO, similar to a normal tool designation. By doing so, the tool designation finishes only by acknowledging and designating each virtual tool in the tool file 7 by an operator without understanding the whole complex tool 21 at the time of composing the machining program PRO. Then, the composing of the machining program PRO is possible with no specific knowledge concerning the complex tool 21. Then, the main control portion 2 searches the tool data DAT of the tool file 7 so as to select the corresponding tool, that is, the virtual tool wherein the tool number TNo as shown in ① of FIG. 3(b) is 1 and tool name NA is "DRL EDG" and suffix DC is "A" as shown on the most upper hand of the figure, and instructs the tool rest control portion 11 to index the tool at the machining position. In the tool file 7, the respective tools (including ① through ⑦ as "virtual tool" regarded seven independent tools of the complex tool 21) are differentiated by tool name NA and suffix DC concerning turning machining related tool (in case of the same tool name NA, it is differentiated by changing suffix DC into "A", "B", "C", "D" and "E"), and are differentiated by tool name NA and nominal diameter/tool angle CA concerning the milling machining related tool, regardless of being the complex tool 21 or not. Then, when tool name NA and suffix DC or tool name NA and nominal diameter/tool angle CA are designated in the machining program PRO, the corresponding tool is immediately determined.

The tool rest control portion 11 drives the tool exchanger which is not shown, and selects the complex tool 21 which tool number TNo is 1 from the tool magazine which is not shown so as to install on the tool rest 20. When the complex tool 21 is installed on the tool rest 20, the tool rest control portion 11 refers to the detailed data DAT2 corresponding to ① turning drill from tool name NA and suffix DC designated in the machining program PRO, and reads out the indexing number KD concerning ① turning drill and the B-axis angle of the complex tool 21 shown in the detailed data DAT2.

The tool rest control portion 11 drives and controls a tool driving motor (not shown) built in the tool rest on the basis of the read indexing number KD concerning ① turning drill and the B-axis angle so as to rotate the complex tool 21 around the axial center CT3. Then, the complex tool 21 is positioned so as to be in the state that indexing number KD is 1. As shown in FIG. 3(c), the state that the indexing number is 1 is one that the insert 22 is positioned, facing the upper hand in the figure (the Y-axis direction). Furthermore, the B-axis driving motor which is not shown is driven, and the tool rest 20 is moved and driven in the direction as shown by the arrows G and H, and the complex tool 21 is positioned so as to be such a state that the B-axis angular position is 0°, and it is parallel to the Z-axis, as shown in FIG. 3(c). In this state, the spindle 15 is rotated and driven at a predetermined rotational number by the spindle driving motor 13, and the complex tool 21 is moved and driven in the arrow A direction of the Z-axis direction so as to form the hole 17a having a predetermined depth on the rotating workpiece 17 by the insert 22, as shown in FIG. 5(M1).

Subsequently, an end face 17b of FIG. 5(M2) is machined by the insert 22 of the complex tool 21. In this case, the tool rest control portion 11 drives the B-axis driving motor with such a state that the tool of ① turning drill is selected as so as to rotate and drive the tool rest 20 a predetermined angle in the direction as shown by the arrow H of the B-axis. As shown in FIG. 5(M2), the complex tool 21 is held in slightly inclined state with respect to the Z-axis, and the end face 17b of the workpiece is machined by the same insert 22.

Next, rough machining is performed on an outside diameter 17c of the workpiece 17 of FIG. 5(M3) by the complex tool 21. In this case, in the machining program PRO, the virtual tool is designated, inputting "GNL OUT" as tool name NA and "B" as suffix DC. Then, the main control portion 2 searches the tool data DAT of the tool file 7, and selects the corresponding tool, that is, the virtual tool which tool name NA is "GNL OUT" and suffix DC is "B", which tool number is 1 shown on the second from the upper of the figure as shown in ② of FIG. 3(b), and instructs the tool rest control portion 11 to index to the machining position of the tool.

The tool rest control portion 11 refers to the detailed data DAT2 corresponding to ② outside diameter rough machining from tool name NA and suffix DC designated in the machining program PRO and reads out the indexing number "3" and the B-axis angle "112°" concerning ② outside diameter rough machining of the complex tool 21 as shown in the detailed data DAT2.

The tool rest control portion 11 drives and controls the tool driving motor (not shown) built in the tool rest on the basis of the read indexing number "3" and the B-axis angle "112°" concerning ② outside diameter rough machining so as to rotate the complex tool 21 around the axial center CT3. Then, the complex tool 21 is positioned so as to become to be such a state that indexing number KD is 3 as shown in FIG. 3(a). Furthermore, the B-axis driving motor which is not shown is driven so as to move and drive the tool rest 20 in the direction as shown by the arrows G and H of the B-axis direction. Then, the complex tool 21 is positioned so as to become to be such a state that the B-axis angular position is 112° anticlockwise with respect to the Z-axis as shown in FIG. 5(M3). In this state, as shown in FIG. 5(M3), the complex tool 21 is moved and driven in the direction as shown by the arrow A of the Z-axis direction so as to machine the outside diameter 17c of the rotating workpiece 17 the predetermined length L1 by the insert 25.

Figure 6:
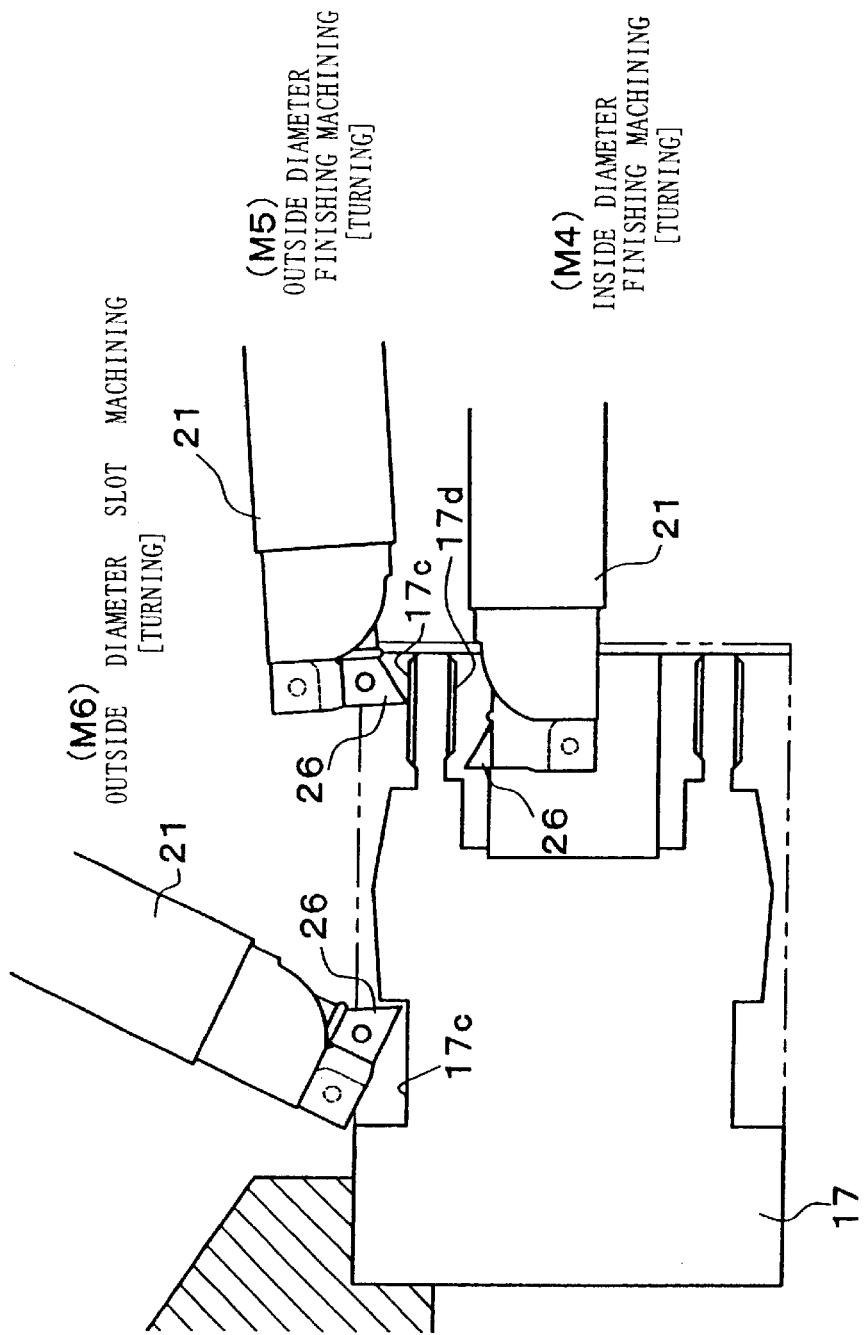

Next, finishing machining is performed on an inside diameter 17d of the workpiece 17 of FIG. 6(M4) by the complex tool 21. In this case, in the machining program PRO, the virtual tool is designated, inputting "GNL IN" as tool name NA and "E" as suffix DC. Then, the main control portion 2 searches the tool data DAT of the tool file 7, and selects the corresponding tool, that is, the virtual tool which tool name NA is "GNL IN" and suffix DC is "E", which tool number is 1 as shown on the fifth from the upper of the figure as shown in ⑤ of FIG. 3(b), and instructs the tool rest control portion 11 to index the tool to the machining position.

The tool rest control portion 11 refers to the detailed data DAT2 corresponding to ⑤ inside diameter finishing machining from tool name NA and suffix DC designated in the machining program PRO and reads out the indexing number "4" and the B-axis angle "0°" concerning ⑤ inside diameter finishing machining of the complex tool 21 as shown in the detailed data DAT2.

The tool rest control portion 11 drives and controls the tool driving motor (not shown) built in the tool rest on the basis of the read indexing number "4" and the B-axis angle "0°" concerning ⑤ inside diameter finishing machining so as to rotate the complex tool 21 around the axial center CT3. Then, the complex tool 21 is positioned so as to become to be such a state that the indexing number KD is 4 as shown in FIG. 3(a). Furthermore, the B-axis driving motor which is not shown is driven so as to move and drive the tool rest 20 in the direction as shown by the arrows G and H of the B-axis direction. Then, the complex tool 21 is positioned such that the B-axis angular position is 0° with respect to the Z-axis, that is, so as to be parallel, as shown in FIG. 6(M4). In this state, as shown in FIG. 6(M4), the complex tool 21 is moved and driven in the direction as shown by the arrow A of the Z-axis direction so as to machine the inside diameter 17d of the rotating workpiece 17 the predetermined length by the insert 26.

Figure 7:
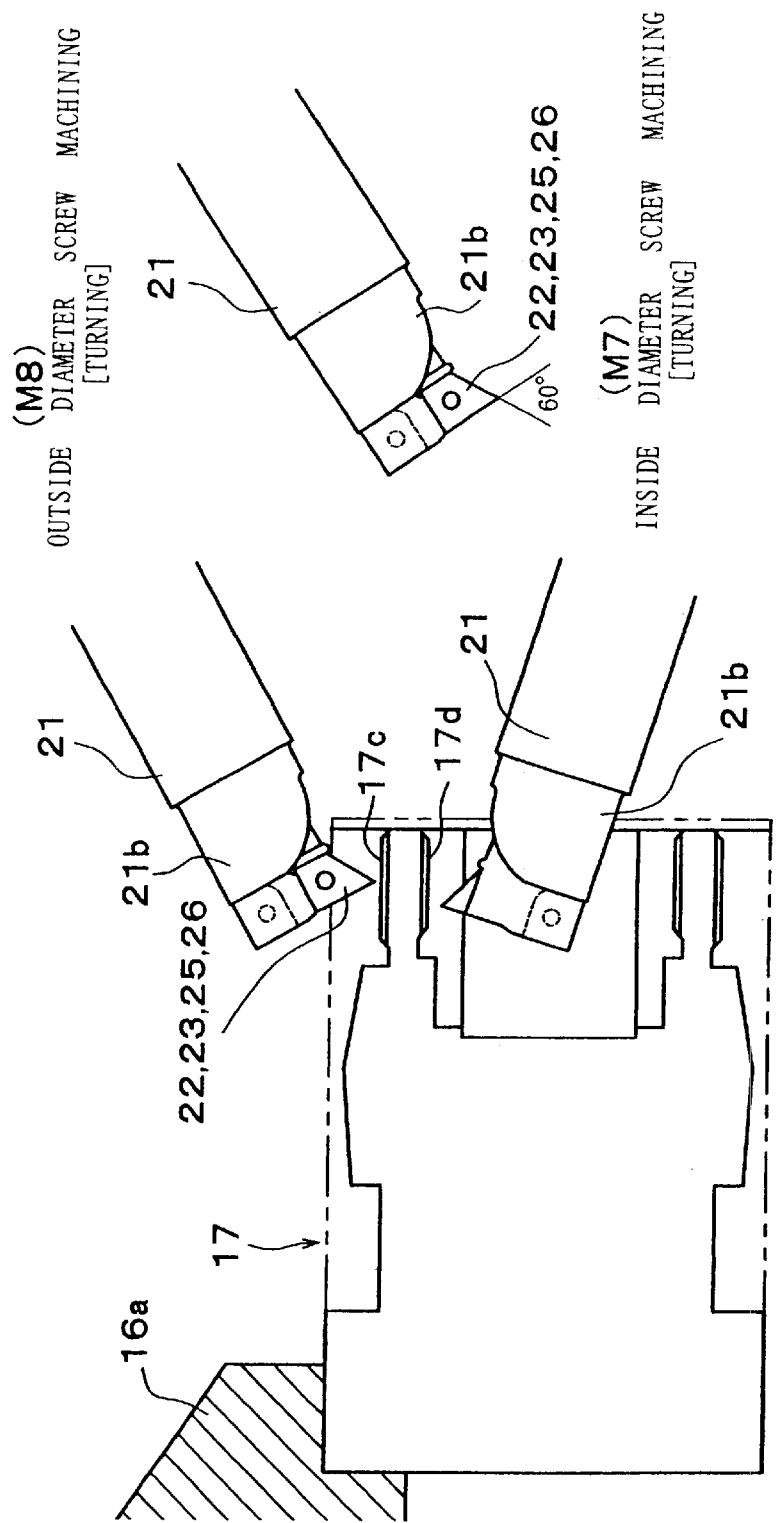

In this way, as shown in (M5), (M6) of FIG. 6 and (M7), (M8) of FIG. 7, the respective inserts 22, 23, 25, 26 of the same complex tool 21 are rotated around the tool axial center CT3 on the basis of the tool data DAT stored in the tool file 7 so as to selectively index and position the insert to be used for machining. And, the tool rest is properly rotated and positioned in the B-axis angular direction so as to perform various kinds of machining, such as the outside diameter finishing machining as shown in (M5) of FIG. 6, the outside diameter slot machining as shown in (M6) of FIG. 6, the inside diameter screw machining as shown (M7) of FIG. 7, and the outside diameter screw machining as shown in (M8) of FIG. 7, on the workpiece 17 by the respective inserts 22, 23, 25 and 26. On this occasion, the virtual tools ① through ⑦ as shown in FIG. 3(c) are not used in a part of the machining concerning FIGS. 6 and 7. But, in this case also, the machining is performed using the virtual tools concerning the complex tool 21 of FIG. 4 set and stored in another part of the tool file 7. For instance, the virtual tool to be used for outside diameter finishing machining of FIG. 6 (M5) is one which tool number TN is 1 (showing the complex tool 21), tool name NA is "GNL OUT", suffix DC is "K", indexing number KD is "2" and B-axis angle is "5°" in the tool file 7, and this is the machining with the insert 26.

Figure 8:
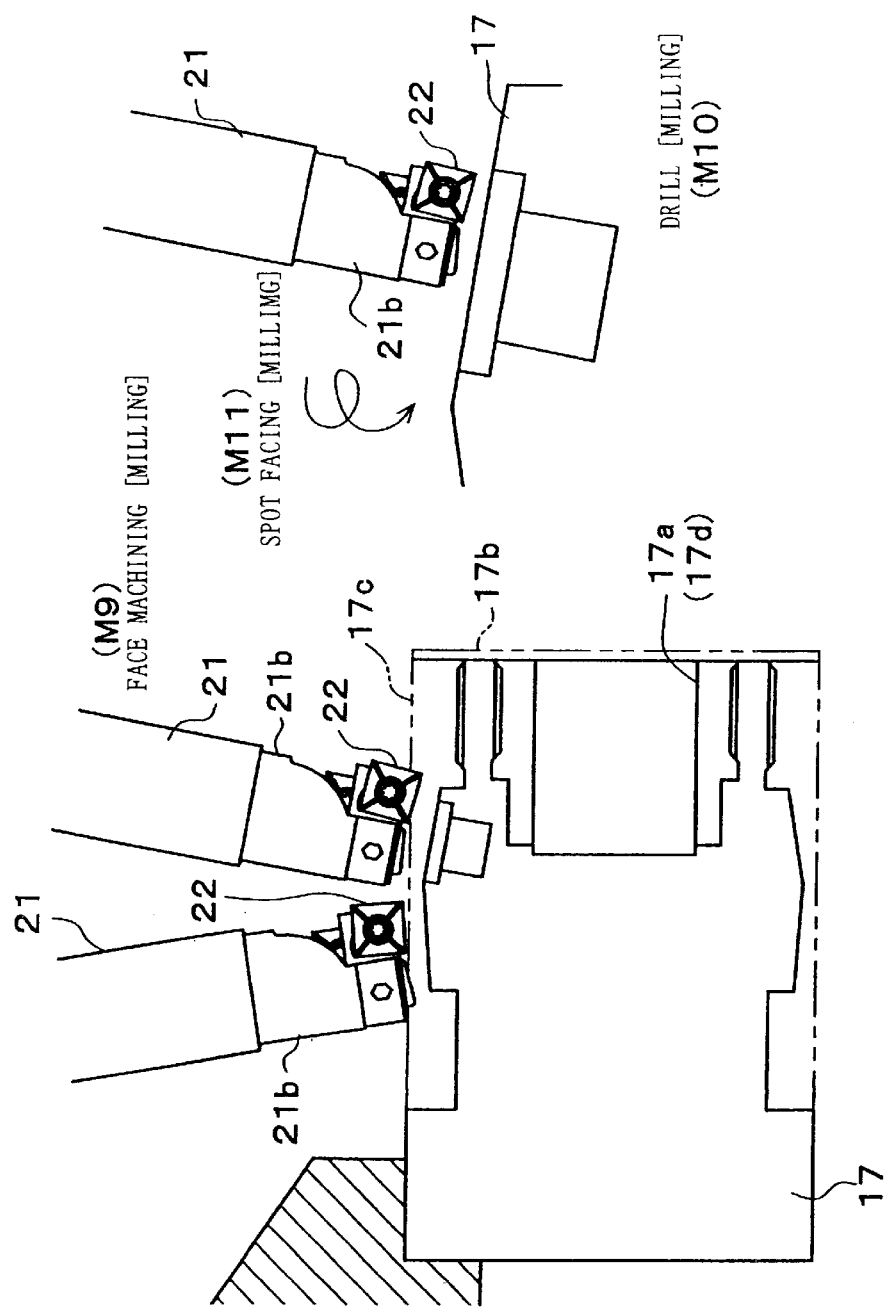

When the turning machining on the workpiece 17 finishes in this way, the milling machining as shown in FIG. 8 (M9), (M10) and (M11) is performed at this time. In this case also, (M9) face machining, (M10) drilling machining and (M11) spot facing machining is performed on the workpiece 17 using ⑥ milling drill and ⑦ end mill of the virtual tools concerning the complex tool 21 set in the tool file 7 of the complex tool 21. ⑥ Milling drill and ⑦ end mill of the virtual tools are the machining by the insert 22 both which indexing number is 1, as shown in FIG. 3(c). Then, the milling machining is performed in such a manner that the workpiece 17 held by the spindle is fixedly held around the Z-axis or is rotated with C-axis control, changing the B-axis angle, rotating the complex tool 21 at a high speed with the axial center CT2 as its center.

By machining as mentioned before, the cutting machining can be performed on the worpiece as shown in FIG. 2, for instance, from a round bar with one complex tool 21.

Figure 9:
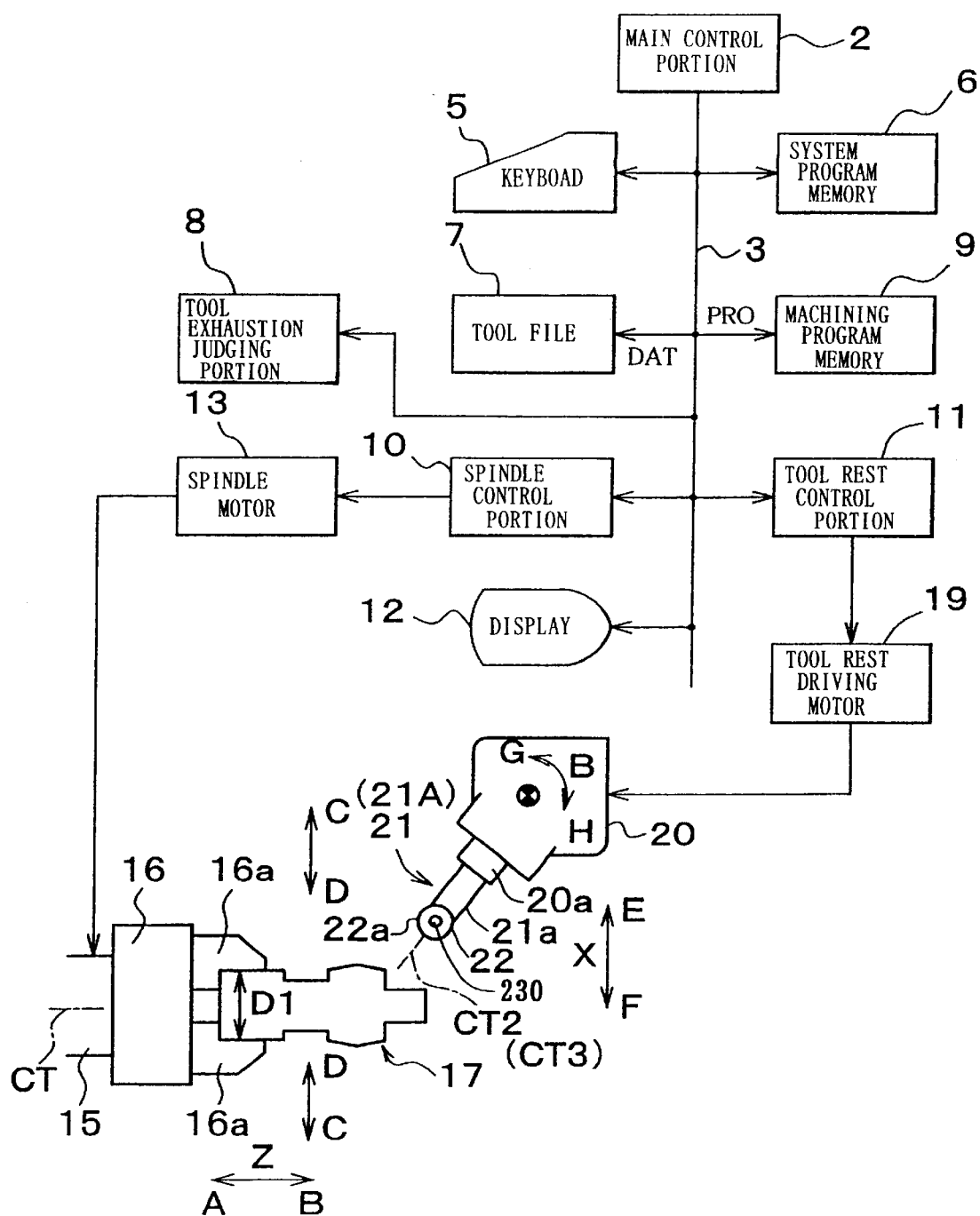
FIG. 9 is a control block diagram showing an example of the complex machining machine tool to which another embodiment of the present invention is applied.
Figure 10:
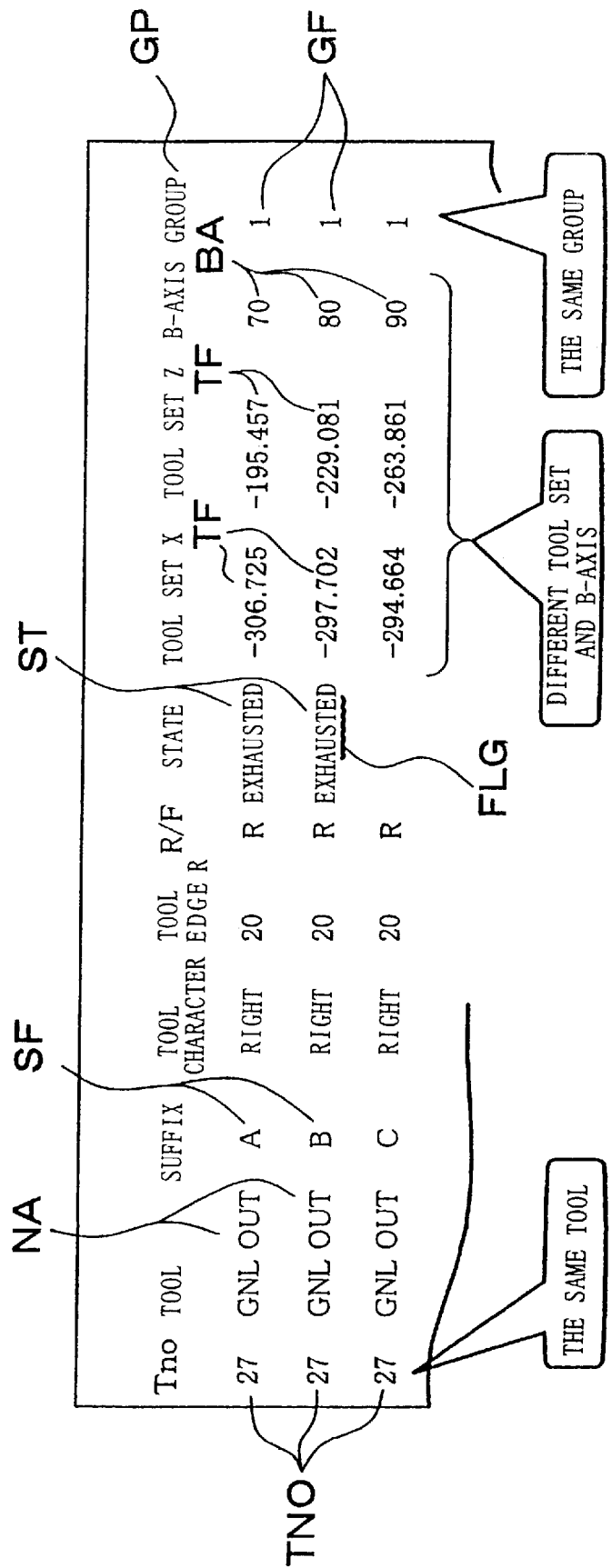
FIG. 10 is a typical view for explaining an example of the tool data stored in tool file of the complex machining machine tool as shown in FIG. 9 and its contents.

Next, another embodiment of the present invention is shown in FIGS. 9 through 11. The part the same as the portion which is already explained in FIGS. 1 through 8 is shown by affixing the same number.

The complex machining machine tool 1 has the main control portion 2, as shown in FIG. 9. With the main control portion 2, the input portion, such as the keyboard 5, the system program memory 6, the tool file 7, a tool exhaustion judging portion 8, the machining program memory 9, the spindle control portion 10, the tool rest control portion 11 and the display 12 are connected through the bus line 3. The spindle motor 13 is connected with the spindle control portion 10. With the spindle motor 13, the spindle 15, provided being free to rotate, drive and position with the axial center CT provided parallel to the Z-axis, as its center, is connected. The chuck 16 is provided with the spindle 15. The claws 16a are provided with the chuck 16, being free to hold and release the workpiece 17 to be machined and being free to move and drive in the direction as shown by the arrows C and D.

The tool rest driving motors 19 (the plural number) are connected with the tool rest control portion 11. The tool rest 20 is connected with the tool rest driving motors 19, being free to move and drive in the Z-axis direction (the direction as shown by the arrows A and B) and in the direction as shown by the arrows E and F rectangular to the Z-axis, that is, in the X-axis direction by the tool rest driving motors 19. Furthermore, the tool rest 20 is provided being free to move and drive in the Y-axis direction rectangular to the X-axis and the Z-axis, rectangular to the paper, and in the direction as shown by the arrows G and H which is the B-axis direction with the Y-axis as its center by the tool rest driving motors 19.

The tool holding portion 20a is formed on the tool rest 20. The tool 21 is provided with the tool holding portion 20a, being free to attach, detach and exchange. The tool holding portion 20a is provided, being free to fix and hold a tool in a predetermined holding state and being free to rotate, drive and position around the axial center CT2.

A so-called button tool 21A, having a button insert at its top, of a plurality of tools 21 to be installed on the tool rest 20 has the main body 21a formed in the round bar shape, as shown in FIG. 11. At the top end of the main body 21a, the button insert 22 in the disc shape is attachably and detachably installed by a locking screw 230. The button insert 22 has a cutting part face 22a on the whole outer peripheral face in the circular shape, as shown in FIG. 11.

The complex machining machine tool 1 has the beforementioned structure. In order to machine the cylindrical workpiece 17, for instance, an operator inputs various kinds of machining data by the method of a known automatic programming, operating the keyboard 5 so as to compose the machining program. On this occasion, the main control portion 2 composes the machining program PRO on the basis of the various kinds of data input by an operator according to a known automatic program composing program stored in the system program memory 6, then the composed machining program PRO is stored in the machining program memory 9.

After the machining program PRO concerning the workpiece 17 is composed, an operator instructs the main control portion 2 to machine the workpiece 17 through the keyboard 5. Receiving this instruction, the main control portion 2 reads out the machining program PRO concerning the workpiece 17 from the machining program memory 9 so as to execute machining, appropriately driving the spindle control portion 10 and the tool rest control portion 11.

When the tool to be used in the machining program PRO is designated at the time of machining on the workpiece 17, the main control portion 2 refers to the tool file 7 and reads out the tool data DAT of the corresponding tool.

As shown in FIG. 10, three outside diameter cutting tools virtually registered are registered as virtual tools concerning the button cutting tool 21A of the tool data DAT stored in the tool file 7. Since the numeral 27 is affixed to the button cutting tool 21A as shown in FIG. 11 as the tool number TNO in the tool file 7, and three outside diameter cutting tools are registered for the button cutting tool 21A as the virtual tools as mentioned before, three same tool number TNO is affixed to the portion where the virtual tools are registered in the tool file 7 and shows that these tools are the virtual tools concerning the same tool.

For these virtual tools, "GNL OUT" showing the tool for outside diameter machining as tool name NA all showing tool kind is affixed, and suffix SF "A", "B", and "C" is affixed in order to differentiate the respective tools for outside diameter machining. Besides, the exhausted state ST of each virtual tool is marked as the tool data DAT, and a flag FLG of "exhausted" stands concerning the virtual tool after using a predetermined machining time. Group mark GF is stored as the flag showing virtual tools 250, 260 and 270 are the same kind of tool at the blank of the group GP. On this occasion, the group mark GF is "1" in case of FIG. 10. In case where different kind of virtual tool is set concerning the same tool, the group mark GF is naturally different. That is, even if the tool name is the same tool for outside diameter machining "GNL OUT", it is used for different kind of machining in many cases, so such a differentiation is necessary.

Furthermore, tool set information TF showing each tool edge position is stored in these virtual tools. And, the B-axis indexing angle BA at the time of indexing each virtual tool from the button cutting tool 21A is 70°,80°, and 90°, and is stored, respectively shifting 10° in its angle. That is, the virtual tool 250 which suffix is "A" of the three virtual tools 250, 260 and 270 is held in such a state that as shown in FIG. 11(a), the tool rest 20 installing the button cutting tool 21A is rotated 70° in the direction as shown by the arrow G of FIG. 9 from the state that the axial center CT2 of the tool installation portion 20a is parallel to the Z-axis, that is, the B-axis angle BA is 0°. A first top 22b of the cutting part face 22a of the button insert 22 is set as the tool edge of the virtual tool 250.

Besides, the virtual tool 260 which suffix is "B" is held in such a state that as shown in FIG. 11(b), the tool rest 20 installing the button cutting tool 21A is rotated 80° in the direction as shown by the arrow G of FIG. 9 from the state that the axial center CT2 of the tool installation portion 20a is parallel to the Z-axis, that is, the B-axis indexing angle BA is 0°. A second top 22c adjacent to the right hand in the figure of the first top 22b of the cutting part face 22a of the button insert 22 is set as the tool edge of the virtual tool 260.

Furthermore, the virtual tool 270 which suffix is "C" is held in such a state that as shown in FIG. 11(c), the tool rest 20 installing the button cutting tool 21A is rotated 90° in the direction as shown by the arrow G of FIG. 9 from the state that the axial center CT2 of the tool installation portion 20a is parallel to the Z-axis, that is, the B-axis indexing angle BA is 0°. A third top 22d adjacent to the right hand in the figure of the second top 22c of the cutting part face 22a of the button insert 22 is set as the tool edge of the virtual tool 270.

If the virtual tool 250 which tool number TNO is 27 and suffix SF is A is designated in the machining program PRO, the main control portion 2 installs the button cutting tool 21A which tool number TNO is 27 on the tool installation portion 20a of the tool rest 20 and positions the button cutting tool 21A at the position where the B-axis indexing angle BA is 70° by rotating and driving the tool rest 20 in the direction as shown by the arrow G on the basis of the B-axis indexing angle BA 70° shown concerning the virtual tool 250 of the tool data DAT.

In this state, the spindle driving motor 13 is rotated and driven at a predetermined rotational number so as to rotate and drive the workpiece 17 held by the chuck 16 at a predetermined rotational number, and the tool rest 20 is moved and driven in the X-axis direction and in the Z-axis direction so as to perform the turning machining on the workpiece 17 by the first top 22b of the virtual tool 250 as shown in FIG. 11(a). During the machining with the virtual tool 250, the tool exhaustion judging portion 8 measures the using time of the virtual tool 250, writes the flag FLG of "exhausted" in the exhausted state ST of the tool data DAT concerning the virtual tool 250 of the tool file 7 and marks that the virtual tool 250 reaches predetermined exhaustion when the using time of the virtual tool 250 reaches the exhaustion time determined in advance.

When the judgement "exhaustion" is given by the tool exhaustion judging portion 8 during the machining with the virtual tool 250, or when the virtual tool 250 is designated as the tool to be used for machining of the workpiece 17 in the machining program PRO after the flag FLG of "exhausted" stands at the exhausted state ST portion concerning the virtual tool 250 of the tool date DAT, the main control portion 2 searches for the tool substituting for the virtual tool 250 in the tool file of FIG. 10. Since the group mark GF "1" is stored concerning the same kind of tool as the virtual tool 250, the virtual tool 260 is adopted from the tools, wherein the group mark GF "1" is stored, as the tool substituting for the virtual tool 250 so as to immediately start the machining on the workpiece 17 with the virtual tool 260.

In the change from the virtual tool 250 into the virtual tool 260, the virtual tools 250, 260 are both the same button cutting tool 21A which tool number TNO is 27 and the B-axis angle only changes from 70° into 80° Then, the main control portion 2 rotates the tool rest 20 through the tool rest control portion 11 10° in the direction as shown by the arrow G when the judgement that the virtual tool 250 is exhausted is given by the tool exhaustion judging portion 8 during using the virtual tool 250. Then, the button cutting tool 21A is positioned at the position where the B-axis angle is 80° and the virtual tool 260 is indexed.

When the virtual tool 250 is designated in the machining program PRO, the judgement that the virtual tool 250 is exhausted is already given and the flag FLG of "exhausted" stands in the tool file 7. Then, the main control portion 2 selects the virtual tool 260 from the tools where the same group mark GF of the tool file 7 is "1", and regards the virtual tool 260 as the virtual tool 250, and installs the button cutting tool 21A which tool number TNO is 27 on the tool rest 20,and furthermore sets the B-axis indexing angle BA to 80° so as to perform the machining on the workpiece with the second top 22c, as shown in FIG. 11(b).

Since the second top 22c of the virtual tool 260 is adjacent to the first top 22b of the virtual tool 250, but is the portion which is not used at the time of machining with the virtual tool 250, the machining of the workpiece 17 by the virtual tool 260 can be smoothly performed in spite of using the same button cutting tool 21A.

When the judgement that the virtual tool 260 also reaches exhaustion is given by the tool exhaustion judging portion 8 during using the virtual tool 260, the flag FLG "exhausted"

is wrote in the portion of the exhausted state ST of the virtual tool 260 so as to mark the virtual tool 260 exhausted, in a similar way to the before-mentioned. Thereafter, by the similar process, the virtual tool 270 which the same group mark GF is "1" is used as substituting tools for the virtual tools 250, 260 which reach exhaustion.

In the change from the virtual tools 250, 260 into the virtual tool 270, the virtual tools 250, 260, 270 are all the same button cutting tool 21A which tool number TNO is 27 and the B-axis angle only changes from 70° and 80° into 90°. Then, the main control portion 2 rotates the tool rest 20 through the tool rest control portion 11 10° or 20° in the direction as shown by the arrow G when the judgement that virtual tool 250 or 260 is exhausted is given by the tool exhaustion judging portion 8 during using the virtual tool 250 or 260. Then, the button cutting tool 21A is positioned at the position where the B-axis angle is 90° and the virtual tool 270 is indexed.

When the virtual tool 250 or 260 is designated in the machining program PRO, the judgement that the virtual tool 250 or 260 is exhausted is already given and the flag FLG of "exhausted" stands in the tool file 7. Then, the main control portion 2 selects the virtual tool 270 from the tools where the same group mark GF of the tool file 7 is "1", and regards the virtual tool 270 as the virtual tool 250 or 260, and installs the button cutting tool 21A which tool number TNO is 27 on the tool rest 20,and furthermore sets the B-axis angle to 90° so as to perform the machining on the workpiece with the third top 22d, as shown in FIG. 11(c).

Since the third top 22d of the virtual tool 270 is adjacent to the first and the second tops 22b, 22c of the virtual tools 250, 260, but is the portion which is not used at the time of machining with the virtual tools 250, 260, the machining of the workpiece 17 by the virtual tool 270 can be smoothly performed in spite of using the same button cutting tool 21A.

As mentioned before, the tool edge positions of the respective virtual tools 250, 260, 270 are stored every respective tops 22b, 22c, 22d as the tool set information TF. Then, even if the virtual tool is changed in the same group mark GF, proper machining can be performed, correcting the tool edge position of the respective virtual tools 250, 260, 270.

The before-mentioned embodiment refers to the case wherein the button cutting tool 21A installing the button insert 22 at its top is used as the tool 21 where a plurality of virtual tools 250, 260, 270 are set. But, the tool where the virtual tools are set is not always the button cutting tool 21A, but may be the tool installing another kind of insert as long as the machining having the same contents can be performed on the workpiece by changing the B-axis position of the tool rest.

The present invention is explained on the basis of the embodiments heretofore. The embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

What is claimed is:

1. A complex machining machine tool having a tool rest capable of attachably and detachably installing a tool having inserts, said complex machining tool comprising:

a tool file for storing tool data to be used in a machining program;

a plurality of virtual tools set and registered in said tool file, said virtual tools concerning at least one predetermined tool, and said tool file storing tool data for every virtual tool including indexing positional data;

means for reading out tool data of a corresponding one of the virtual tools from said tool file on the basis of machining instruction stored in said machining program and indexing at least one predetermined tool on said tool rest on the basis of said indexing positional data of said tool data; and a machining execution means for executing machining on the basis of at least one of the virtual tools corresponding to said predetermined tool.

2. The complex machining machine tool of claim 1, wherein a plurality of at least one said predetermined tool is set and registered as the virtual tool for executing the machining concerning a plurality of machining capable of performing with this tool in said tool file.

3. The complex machining machine tool of claim 1, wherein a plurality of virtual tools is set in said tool file concerning one of said inserts.

4. The complex machining tool of claim 1, wherein two kinds of tools, a turning tool and a milling tool are set in said tool file concerning one of said inserts.

5. The complex machining tool of claim 1, wherein said tool is a turning tool, said tool rest is movably and drivably provided in a first axial direction and a second axial direction orthogonal to each other, and the tool rest is provided being free to position its rotational angle with a third axis orthogonal to the first axial direction and the second axial direction as its center, capable of performing turning machining on a rotating workpiece by said turning tool, further comprising at least two virtual tools, said at least two virtual tools being of the same kind and having respective indexing angular positions with the third axis being different from each other, said at least two virtual tools being set and registered concerning said turning tool.

6. The complex machining machine tool of claim 5, wherein said turning tool is a button cutting tool installing a button insert at its top.

7. The complex machining machine tool of claim 5, wherein a plurality of virtual tools of the same kind belonging to said one turning tool is affixed the same group mark in said tool file.

8. The complex machining machine tool of claim 1, wherein information showing tool edge position for each of said virtual tools is stored as tool data in said tool file.

9. The complex machining machine tool of claim 5, wherein said machining execution portion has tool exhaustion judging means for judging tool exhaustion concerning said virtual tool, substituting tool judging means for adopting another virtual tool of the same kind set on the turning tool on which the virtual tools are set as substituting tools when the judgment that said virtual tool reaches exhaustion is given by said tool exhaustion judging means, and machining execution means for executing machining by using the virtual tool judged as the substituting tool by said substituting tool judging means.

10. The complex machining machine tool of claim 5, wherein said first axis is an X-axis, said second axis is a Z-axis, said third axis is a Y-axis, which is orthogonal to said X-axis and said Z-axis, and said tool rest is provided being free to position its rotational angle in a B-axis direction with said Y-axis as its center.

* * * * *